US009292625B2

United States Patent
Tyagi et al.

(10) Patent No.: US 9,292,625 B2
(45) Date of Patent: Mar. 22, 2016

(54) DYNAMIC DETERMINATION OF PATTERN TYPE AND CHART TYPE FOR VISUAL ANALYTICS

(71) Applicants: Harish Tyagi, Cupertino, CA (US); Xiaojun Feng, Palo Alto, CA (US)

(72) Inventors: Harish Tyagi, Cupertino, CA (US); Xiaojun Feng, Palo Alto, CA (US)

(73) Assignee: SAP SE, Walldorf (DE)

( * ) Notice: Subject to any disclaimer, the term of this patent is extended or adjusted under 35 U.S.C. 154(b) by 276 days.

(21) Appl. No.: 14/034,342

(22) Filed: Sep. 23, 2013

(65) Prior Publication Data

US 2015/0088808 A1    Mar. 26, 2015

(51) Int. Cl.
    *G06F 17/30*    (2006.01)
(52) U.S. Cl.
    CPC .................... *G06F 17/30994* (2013.01)
(58) Field of Classification Search
    USPC ........................................ 715/700, 763
    See application file for complete search history.

(56) References Cited

U.S. PATENT DOCUMENTS

| 2012/0144325 A1* | 6/2012 | Mital | G06F 9/4446 715/763 |
|---|---|---|---|
| 2013/0073389 A1* | 3/2013 | Heath | G06Q 50/01 705/14.54 |
| 2013/0073400 A1* | 3/2013 | Heath | G06Q 30/02 705/14.73 |
| 2013/0073473 A1* | 3/2013 | Heath | G06Q 30/02 705/319 |
| 2013/0139081 A1* | 5/2013 | Alon | G06Q 10/10 715/765 |
| 2013/0144957 A1* | 6/2013 | Sherman | G06Q 50/01 709/206 |
| 2013/0159926 A1* | 6/2013 | Vainer | G06F 17/30 715/804 |
| 2013/0166577 A1* | 6/2013 | Barak | G06F 17/30867 707/754 |
| 2013/0205020 A1* | 8/2013 | Broda | G06F 11/3495 709/224 |

* cited by examiner

*Primary Examiner* — Kim Nguyen
(74) *Attorney, Agent, or Firm* — Fountainhead Law Group PC

(57) ABSTRACT

Systems and methods for determining alternative visual analytics are described. Visual analytics result from the application of visual analytic patterns that include instructions for generating visualizations of analytical data. Analytical data is the result of the execution of analytical operations specified in a report definition on an underlying business object. By analyzing the metadata associated with the report definition or visual analytic pattern, alternative visual analytic patterns may be determined that better represent the character of the analytical data. The metadata may include a mapping that associates alternative visual analytic patterns with a business object, a report definition, or another visual analytic pattern. Accordingly, the determination of the alternative visual analytic patterns may be based on the mappings. The alternative visual analytic pattern s may then be applied to the analytic data to generate one or more alternative visual analytics that may be selected by a user.

18 Claims, 8 Drawing Sheets

DYNAMIC DETERMINATION OF PATTERN TYPE AND CHART TYPE FOR VISUAL ANALYTICS

BACKGROUND

Unless otherwise indicated herein, the approaches described in this section are not prior art to the claims in this application and are not admitted to be prior art by inclusion in this section.

The present invention relates to the analysis of business data, and in particular to improved techniques for customized presentation and consumption of visual analytic data. In the course of conducting business, many entities (e.g., businesses) generate large amounts of data. To help make sense of such vast amounts of data, many business systems use business systems that rely on integrated and add-on analytical tools to analyze, summarize, or otherwise process the data. For example, a typical business system may include a number of databases containing large stores of business data on which an analytical engine can execute various analytical operations. The specifications and order of the analytical operations can be designed to generate specific analytical data for a particular purpose or use. For instance, a manufacturing manager may use the analytical engine in an accounting system to aggregate costs from many invoices for components that are used to produce end products to calculate the total component cost of the end products. The resulting analytical data (e.g., the total component costs for various end products) can be compiled into an analysis report according to a particular report definition. The report definition may specify any number of analytical operations to produce analytical data with specific dimensions that are presented in a specific analysis report format (e.g., level of granularity, time period, specific product groups/types presented in a tabular form). For example, a report definition may specify that the aggregation of the costs from the invoices be performed on a weekly, monthly, annual, or other periodic basis for individual end products or groups/families of end products, and presented in specific file format (e.g., a spreadsheet with specific column names) based on the needs or purposes of the manufacturing manager.

While the resulting analysis reports may be useful to the intended end users (e.g., business users), the typical intended end user is not usually capable or interested in defining the report definition (i.e., designing and programming the necessary backend analytical operations) that generates the report. In general, specialized users with a high level of technical expertise and understanding of the underlying data structures are responsible for designing and implementing report definitions. These users are often referred to as "technical users".

Technical users are usually adept, not only at defining and implementing report definitions, but also at interpreting and understanding the resulting reports. However, most end users of business systems are not technical users and, therefore, do not usually have the level of technical expertise necessary to easily understand the resulting reports, let alone define and implement analytical operations to create their own report definitions. To the average business user, most analysis reports look like a table of meaningless numbers that are difficult to consume or summarize. To increase the usability of analysis reports, various techniques have been developed to present the analytical data in the reports to non-technical users in more easily understandable formats.

For example, some business systems execute predetermined report definitions (e.g., collections of individual and interrelated analytical operations) on the underlying data to generate analytical data that can ultimately be represented in one or more visual analytics (e.g., charts, graphs, tables, etc.) that are easily understandable by non-technical users. Such predetermined reports definitions and the visual analytics are usually designed by a technical user with a particular purpose or mode of consumption in mind. Based on individual needs, non-technical users, who are often referred to herein as "business users", can select the predetermined report definitions and visual analytics to be included in customized or personalized user interface (UI) portals commonly referred to as "dashboards".

Such dashboards often include graphical user interfaces (GUIs) that present business users with selections of compact and succinct representations of the visual analytics within an organized framework (e.g., a grid of framed visual analytics having to do with specific aspects of a business or venture) that are of particular pertinence to the tasks and responsibilities of the associated business user. For instance, a manufacturing engineer may be interested in the logistics of a supply chain for a particular product line and/or the available manufacturing resources within the company for resource planning purposes. In such scenarios, the manufacturing engineer may select a particular report definition that when applied to the appropriate business data will generate a report that represents forecasted production capabilities of one or more component manufacturers. The manufacturing engineer can also select and apply a number of predetermined visual analytic patterns (i.e., instructions for generating one or more visual analytics) that the business system can apply to the analytical data in the report to generate specific visual analytics. For example, the manufacturing engineer may select a visual analytic pattern that, when applied to the appropriate analytical data/analysis report, causes the business system to render a labeled line graph of projected supplier factory outputs, or a stacked bar graph that shows total versus available internal production capacities with percentile labels. The resulting visual analytics are then displayed to the manufacturing engineer (i.e., the intended end user) in a home page of his portal or client application that accesses the business system.

SUMMARY

Embodiments of the present invention improved systems and methods for displaying visualizations of business and analytical data in business systems. Visualizations displayed in dashboard UI environments are automatically analyzed to determine alternative visualization patterns that present the data with improved clarity and concision.

In one embodiment, the present invention includes a computer implemented method that includes retrieving information associated with a visual analytic, the visual analytic includes a first visualization of analytical data generated from a business object in accordance with a report definition and a corresponding analytic pattern. The report definition may include analytical operations operable on the business object to generate the analytical data, and the analytic pattern may include instructions for generating the first visualization of the analytical data. The method may also include analyzing the information associated with the visual analytic to generate an alternative analytic pattern that includes instructions for generating a second visualization of the analytical data different from the first visualization, and sending the alternative analytic pattern to a client computing device.

In one embodiment, the information associated with the visual analytic includes metadata associated with the report definition, the metadata that includes descriptions of the analytical operations.

In one embodiment, the information associated with the visual analytic includes metadata associated with the analytic pattern, the metadata that includes descriptions of the first visualization.

In one embodiment, the information associated with the visual analytic includes a mapping that includes an association between the alternative analytic pattern and at least one of the report definition, the analytic pattern, or the business object, and analyzing the information includes referencing the mapping.

In one embodiment, sending the alternative analytic pattern to the client computing device also includes generating the second visualization of the analytical data in accordance with the alternative analytic pattern, and sending the second visualization to the client computing device.

In one embodiment, the method also includes modifying the report definition by augmenting the analytical operations operable on the business object to generate additional analytical data required by the alternative analytic pattern for generating the second visualization of the analytical data, and the analytical data includes the additional analytical data.

In one embodiment, the method also includes analyzing the first visualization or the second visualization to determine a first region in the first visualization or the second region in the second visualization with space in which to render a legend control. In one embodiment, region may be determined by identifying an area of the visualization that has little or no information (e.g., place in a graph that is empty or does not include part of the chart or graph). In other embodiments, the legend control may be rendered as transparent and floating above any part of the visualization 125. Alternatively, the location of the legend control 410 may be moveable so that user can change its location by dragging and dropping it. In all such embodiments, the region of each visual analytic in 120 or visualization 125 in a particular dashboard UI 110 in which the corresponding legend control 410 is rendered may be different. For example, in one visual analytic 120 the legend control 410 may be in the top right hand corner, while in another visual analytic 120 the legend control 410 may be off to one side.

In another embodiment, the present invention includes a non-transitory computer readable medium having instructions stored thereon, that when executed by a computer processor cause the computer processor to be configured for retrieving information associated with a visual analytic. The visual analytic includes a first visualization of analytical data generated from a business object in accordance with a report definition and a corresponding analytic pattern. In some embodiments the report definition comprises analytical operations operable on the business object to generate the analytical data, and the analytic pattern includes instructions for generating the first visualization of the analytical data. The instructions may also cause the computer processor to be configured for analyzing the information associated with the visual analytic to generate an alternative analytic pattern that includes instructions for generating a second visualization of the analytical data different from the first visualization, and sending the alternative analytic pattern to a client computing device.

In yet another embodiment, the present invention includes system having a computer processor, and a non-transitory computer readable medium coupled to the processor and includes instructions. When the instructions are executed by the computer processor they cause the computer processor to be configured to retrieve information associated with a visual analytic. The visual analytic may include a first visualization of analytical data generated from a business object and in accordance with a report definition and a corresponding analytic pattern. The report definition includes analytical operations operable on the business object to generate the analytical data. The analytic pattern includes instructions for generating the first visualization of the analytical data. The instructions further cause the computer processor to analyze the information associated with the visual analytic to generate an alternative analytic pattern comprising instructions for generating a second visualization of the analytical data different from the first visualization, and send the alternative analytic pattern to a client computing device.

The following detailed description and accompanying drawings provide a better understanding of the nature and advantages of the present invention.

DETAILED DESCRIPTION

Figure 1:
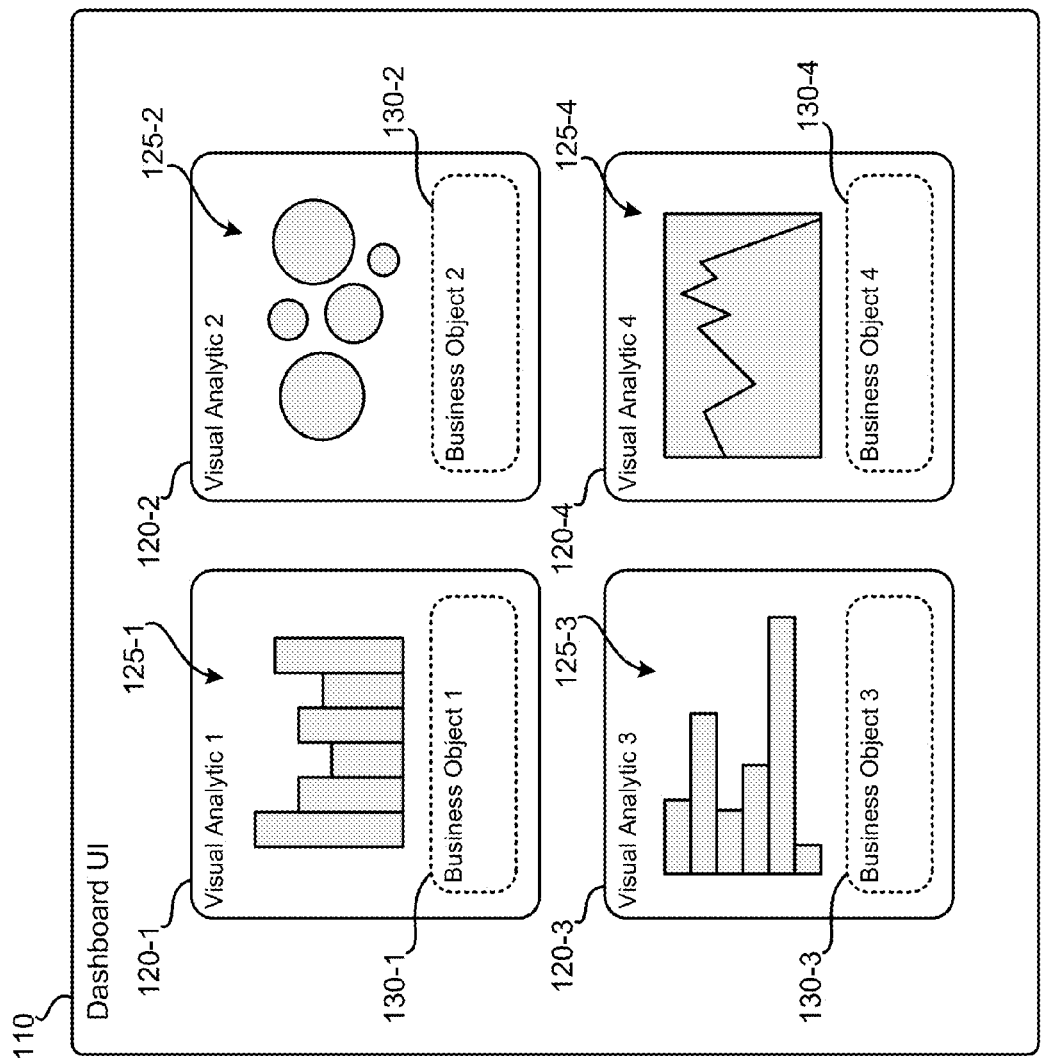
FIG. 1 illustrates a dashboard UI for presenting visual analytics that can be improved by various embodiments of the present disclosure.

Described herein are techniques for systems and methods for analyzing the content and format of visual analytics to generate recommendations for alternative visual analytics that present the underlying data with improved clarity or insight. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include systems and methods for analyzing the content and format of visual analytics to improve the efficacy of such visualizations to portray useful information to end users. An end user may be authorized to access some portion of the business data stored in a business system. To better understand the information contained in the business data, such as a particular object, an end user may choose to generate a number reports to analyze the object. To improve the analytical value of a report, the business system may further analyze the report to generate a visual analytic that includes visualizations of the analytical data in the report to provide easily understandable visual representations that are quickly consumable by an end user.

While the design and structure of the underlying business data, report definitions, and visual analytics may be the result of the efforts of one or more technical users, business systems may provide business users with simplified tools, menus, and controls to select specific business objects and appropriate predefined report definitions and visual analytic patterns to include in their business system UIs (e.g., dashboard UIs). Once a particular user has selected a number of business objects and a number of predefined report definitions and visual analytic patterns to apply to the business objects, his or her dashboard UI may be populated or rendered with the resulting visual analytics.

A pattern optimizer may analyze the content and format of the visual analytics to determine whether an alternative visual analytic pattern is available that would represent the underlying analytical and business data in a more clear and concise manner. In one embodiment, the pattern optimizer may analyze information associated with the visual analytics shown in a particular dashboard. For example, the pattern optimizer may analyze the analytical data in the corresponding report, metadata associated with the report definition or analytic pattern, information contained in or associated with a business object, or mappings between report definitions, metadata, analytic patterns or business objects and one or more predetermined alternative visual analytic patterns. In an example embodiment, a particular business object can be mapped to one or more specific alternative analytic patterns such that whenever the pattern optimizer detects the use of that particular business object, the pattern optimizer can recommend the specific alternative analytic patterns to which it is mapped.

FIG. 1 illustrates an example of a typical dashboard UI 110. The dashboard UI 110 may include a number of visual analytics 120 that display visualizations 125. The visualizations may represent the information from the business object 130 or analysis of the information in the business object 130 (i.e., analytical data from a report generated by the execution of a report definition on the business object 130). The analysis of the information can be based on predetermined reports definitions that define a number of analytic operations performed on underlying business object 130. UIs, like dashboard UI 110, may allow business users to select and arrange a collection of visual analytics 120 for information in which they are interested. However, business users are usually only allowed to select from a predetermine collection of visual analytics because most business users do not have the expertise in or knowledge of the underlying business objects 130, available report definitions, and possible variations of visualizations 125 necessary to specify a set visual analytics 120 that optimizes the ease and clarity with which the underlying data and analysis may be consumed. Such knowledge and expertise in the intricacies of the business system is typically entrusted to some number of technical users.

In an effort to increase the efficacy of a particular business system, technical users continually work on new and improved methods for analyzing and visualizing the data in the business system. Accordingly, the technical users may periodically or systematically develop new and improved report definitions and visualizations for analyzing and visualizing the underlying business data. Even if the technical users broadcast notifications (e.g., send out email bulletins) about the new and previously available report definitions and visualizations to the business users, it is highly unlikely that many of business users will have the time or the interest to appreciate how such report definitions and visualizations will help them with respect to their individual job functions and responsibilities. As such, it is often the case that many of the available sophisticated and useful report definitions and visualizations are underutilized.

For example, the dashboard UI 110 depicted in FIG. 1 shows multiple visual analytics 120 with which a particular business user may be familiar and comfortable. The particular example dashboard UI 110 shown in FIG. 1 includes four visual analytics 120 in a grid layout that may have been chosen by a particular user for a particular purpose. Additional and more effective visual analytics may be available about which the particular is not aware. Embodiments of the present disclosure assist users in selecting potentially better and potentially more effective visual analytics 120.

One of ordinary skill will recognize that any number of visual analytics 120 may be included in any arrangement in the dashboard UI 110, or other type of UI, without departing from the spirit or scope of the present disclosure. In addition to the visual analytics 120, the dashboard UI 110 may also include various graphical controls for selecting, editing, changing, rearranging, or otherwise interacting with the visual analytics 120. As shown, each one of the visual analytic 120 may include one or more visualizations 125 that depict the corresponding results of a report definition having been executed on the associated underlying business object 130. As described above, the initially displayed visualization 125 may or may not be the optimal manner in which to represent or portray the analytical data in underlying report. Embodiments of the present disclosure can analyze the underlying business object 130, visual analytics 120, and the analytical data generated by the associated report definition to automatically suggest alternatives to the visual analytics 120 and/or visualizations 125.

Figure 2:
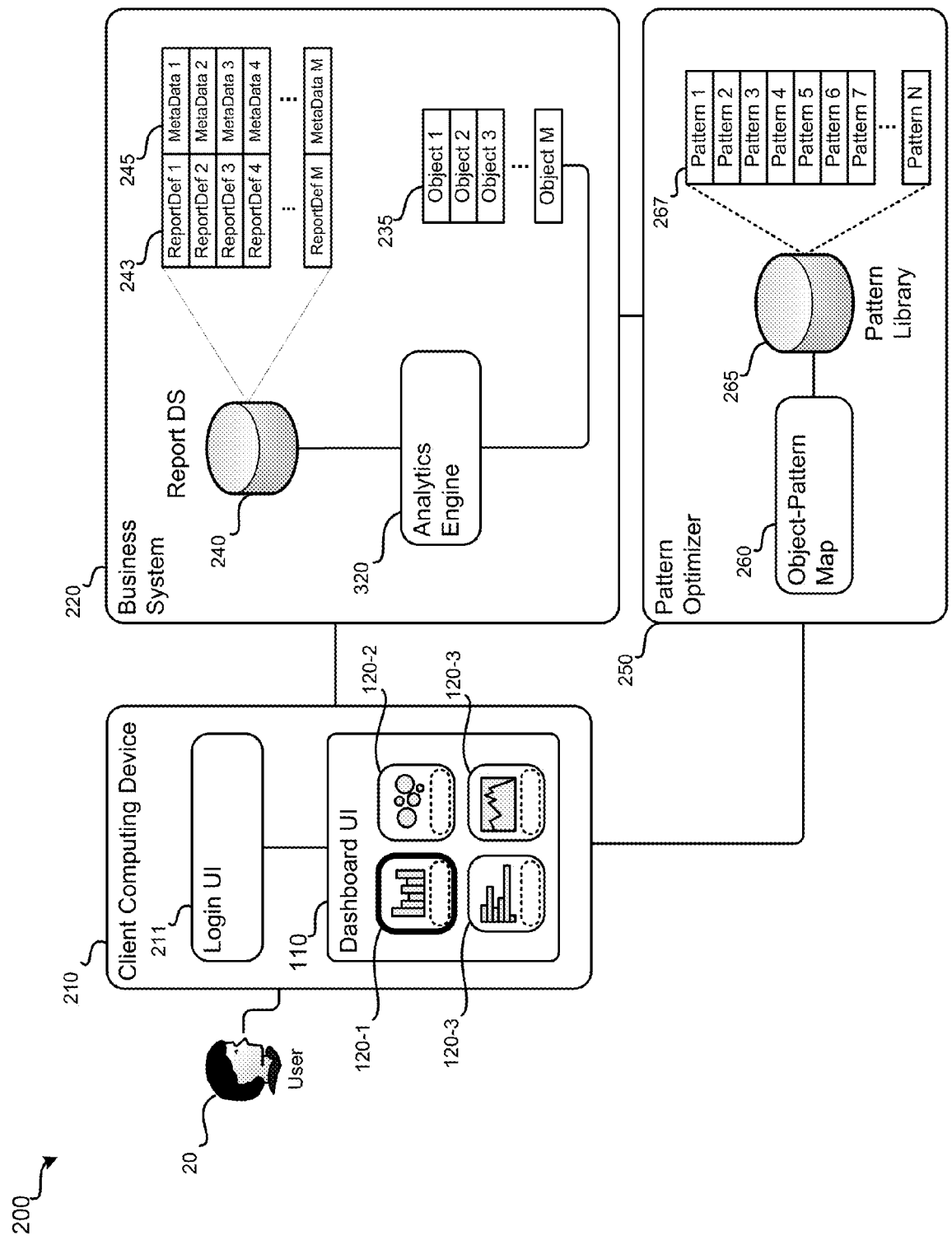
FIG. 2 is a schematic of a system for dynamically determining visual analytics according to various embodiments of the present disclosure.

FIG. 2 is a block diagram of a system 200 for automatically analyzing visual analytics 120 and determining alternative visual analytic patterns, according to one embodiment of the present disclosure. As shown, the system 200 includes a single business system 220, however, business system 220 may also be implemented as a distributed system. Accordingly, the business system 220 may be implemented as a combination of hardware, firmware, and software operating in one or more computer systems (e.g., networked server computers or a cloud computing environment).

The business system 220 may be coupled to multiple client computing devices 210. For example, the business system 200 may be coupled to one or more client computers, smart phones, tablet computers, etc. The business system 220 and the client computing device 210 may communicate with one another using one or more wired or wireless electronic communication media or protocols. For example, the client computing device 210 may include a wireless network interface for communicating with the business system 210 that is connected to a secure local area or wide area network. In such embodiments, the client computing device 210 may include an IEEE 802.11 network interface transceiver that can communicate with the business system 220 in remote location through the Internet.

The client computing devices 210 may include various hardware, firmware, and software for implementing one or more UIs. For example, the client computing device 210 may include one or more GUIs for presenting a login UI 211 and a dashboard UI 110. The login UI 211 may receive authentication credentials from a user 20. The client computing device 210 may then send the user authentication credentials to the business system 220. Based on the authentication credentials, the business system 220 may determine that the user is authorized to access some portion of its business data.

In the particular example embodiment shown in FIG. 2, the business data includes a number of business objects 235. Accordingly, the user may be authorized to access some subset of the business objects 235. As used herein, the term "business object" may refer to an object that is used to model a business process, such as a customer, an invoice, an order, material, a business transaction, a contract, or the like.

In addition, the business system 220 may also retrieve, based on the user authentication credentials, such as a user identifier and password pair, a set of report definitions 243 stored in report data store (DS) 240 that are associated with the user 20. For example, the business system 220 may look up a set of preferences associated with the user identifier that specify a number of report definitions 243 selected by the user 20. In some embodiments, the set of report definitions 243 for a particular user 20 may include default, predetermined, or an assigned set of report definitions 243 associated with the user authentication credential, job function, department, or group associated with the user 20. For instance, the subset of report definitions 243 for a user 20 who is salesperson in a particular regional sales territory, may include report definitions defined by or specified by his or her sales manager who manages that sales territory, such that all of the sales people in that group see at least some of the same visual analytics 120 in their respective dashboard UIs 110.

The analytics engine 320, or some other component of business system 220, may execute the analytical operations defined in a report definition 243 on a business object 235 according to default or customized preferences associated with a particular user to generate one or more reports. In one specific example, a particular report definition 243 may include analytical operations for aggregating, sorting, and filtering business data in one or more business objects 235 to generate a sales report that includes table of total sales per territory attributable to individual sales people in a particular sales group.

The business objects 243 may include defined attributes and methods. Attributes may include strings or values that describe an object in greater detail and include information, such as a name, bill due date, sales region, and other similar dimensions or descriptions. Methods are the operations that can be executed on the business object. For example, a method may include advanced business application programming (ABAP) language function calls, such as function modules, transactions, and dialog modules. Accordingly, the analytical operations of a report definition 243 may include an interface that can access the attributes and methods of the business objects 235.

Once the analytics engine 320 has generated some or all of the requisite reports, it can send the resulting reports to the pattern optimizer 250. The pattern optimizer 250 may access the pattern library 265 to determine one or more visual analytic patterns 267 to apply to the resulting report to generate a corresponding visual analytic 120. In one specific example, the pattern optimizer may select an analytic pattern 267 to apply to the sales report discussed above to generate one or more visualizations 125, such as sales trends charts and sales totals graphs, of the information and analysis in the sales report. The collection of the visualizations 125 may be combined into a composite representation or "visual analytic" 120. Visual analytics 120 may include labels, keys, numerics, legends and other information from the report and/or business object 130 to help indicate to a user what is being depicted in the associated visualizations 125. The pattern optimizer 250 may then return the resulting visual analytics 120 to the business system 220 or analytics engine 320. In other embodiments, the pattern optimizer 250 may send the completed visual analytics 120 directly to the client computing device 210 to be displayed in the dashboard UI 110

As used herein, the term "analytic pattern" refers to a set of specifications and analytical steps or processes that may be applied to some or all business data in a business object or analytical data in a report for generating a corresponding visual analytic 120. The term "visual analytic" may refer to a collection or layout of individual visualizations 125 and other data in a predetermined unit of area (e.g., a window or framed area that can be inserted into a dashboard as a unit). As such, a visual analytic 120 may include visual representations, analysis, and explicit recitation of data from a corresponding report or business object. In some embodiments, each visual analytic 120 displayed to the user can be explicitly associated with a particular business object 130. Accordingly, resulting visual analytics 120 can be defined by the association of the underlying business object 130 with one or more report definitions 243 and/or visual analytic patterns 267.

The business system 220 or pattern optimizer 250 may send the visual analytics 120 to the client computing device 210 to be displayed in the dashboard UI 110. In some embodiments, sending the visual analytics 120 may include sending data in a predetermined format that the dashboard UI 120 can use to render corresponding visual analytics 120 in a display device of the client computing device 210 (e.g., a touchscreen). In some embodiments, the predetermined format may include visual analytic patterns 267 populated, combined, or associated with the pertinent data from a corresponding report and/or object. In such embodiments, the dashboard UI 110 may use the computing resources of the client computing device 210 (e.g. the computer processor, memory, display device, and non-volatile memory) to render the visual analytics 120. Accordingly, the client computing device 210 may include computer readable instructions that when executed by a processing unit in the computing device 210 configures the device to act as a thin client to display the resulting visual analytics 120 in the dashboard UI 110 and to receive further user input for manipulating and interacting with visual analytics 120. Any input the dashboard UI 110 receives from the user 20 can be sent to either the business system 210 or the pattern optimizer 250.

Before or after the visual analytics 120 are generated and/or sent to the client computing device 120, the analytics engine 320 or the pattern optimizer 250 can perform various analyses to determine if the resulting visual analytics 120 are optimal. Such analysis can occur during or after the analytics engine 320 accesses business objects 235, executes analytical operations according to one or more report definitions 243, or generates or receives visual analytics 120. In some embodiments, the analytics engine 320 or the pattern optimizer 250 can analyze the metadata 245 associated with a particular report definition 243 to determine the specifications of the analysis represented in the resulting report.

As used herein, the metadata 245 associated with a particular report definition 243 may include descriptions of the type of analysis that will be performed on a particular object 235 to generate the resulting report. The metadata 245 may include descriptions of processes for specific aggregations, filters, sorts, and the like. Accordingly, the analytics engine 320 is able to determine the dimensions of a particular report. For example, the analytics engine 320 may determine from the corresponding metadata 245 that the report resulting from the execution of a particular report definition 243 will generate aggregate sales numbers for a particular period of time as a function of salesperson or customer.

The analytics engine 320 or the pattern optimizer 250 may also examine a set of predetermined object-pattern mappings 260 that can be included in the pattern optimizer 250. The object-pattern map 260 can include a number of associations between specific objects 235 and corresponding alternative visual analytic patterns 267. Based on the analysis of the associated business object 235, the report definition 243 and its corresponding metadata 245, and information contained in the object-pattern map 260, the analytics engine 320 and/or the pattern optimizer 250 can determine a number of alternative visual analytics for a particular visual analytic 120 generated for a particular user.

For instance, the analytics engine 320 and/or the pattern optimizer 250 may analyze the various aspects of the sales report or visual analytic (i.e., dimensions, time ranges, employee names, user job functions, etc.) previously discussed to determine one or more alternative analytic patterns that has been reportedly useful to other users with similar job functions who were looking at similar data. Accordingly, the alternative visual analytic may include a number of visual representations and metrics that one or more other users may have previously determined to be helpful for a particular purpose. The alternative visual analytic may include labeling or displaying the sales data in the sales report in different manner to reveal different aspects of the analysis. For example, by changing the scale of aggregation for total sales of a particular product from monthly or quarterly, sales trends that occur in weekly cycles that are hidden when the sales data is analyzed on a monthly basis. Accordingly, the analytics engine 320 or the pattern optimizer 250 may analyze the user identifier associated with the user 20 to determine a particular role or job function, based on which, it may predict the associated purpose or intended use of the resulting visual analytics. For example, a regional sales manager may be interested in viewing the data in a similar way that other regional sales managers or national sales managers view similar data.

In other embodiments, the alternative analytic patterns may be specifically designed to improve the clarity of information in and the analysis of a particular business object 235. A technical user may review particular analytic patterns 267 used to visualize recently used report definitions executed on a particular business object 235. Based on that review, the technical user may notice that there are aspects or nuances in the business object 235 or report that are being overlooked or missed based on the use of the particular analytic pattern 267. For instance, the technical user may notice that while the output of one group of researchers of a company are consistently more productive than another group based on a research group-wise way of measuring researchers output, that there is also a geographic differential in output across all groups. Regardless of which group a researcher is in (e.g., materials research, chemical research, biological research, etc.), there may be a differential in research or patent application generation based on whether the researcher is located in one facility as opposed to another. Accordingly, the technical user may design a new analytic pattern 267 that will provide better insight into particular business object 235 or a report that included information about the researchers' geographic based differences. To provide the improved analytic pattern 267 as an option to users looking at researcher output data, the technical user may associate the improved analytic pattern 267 with the particular business object 235. The association, or mapping, between a particular business object 235 and one or more analytic patterns can be recorded in an object-map. That new analytic pattern 267 can then be applied to the particular business object 235 or a report resulting from the execution of a report definition 234 to the business object 235 to generate an alternative visual analytic.

The analytics engine 320 or the pattern optimizer 250 may send a selection of the alternative visual analytics to the client computing device 210. The selection may include the identifiers of the alternative visual analytics or mock-ups of the alternative visual analytics. Indications or representations of the alternative visual analytics may then be displayed in the dashboard UI 110.

Rendering the alternative visual analytics in the dashboard UI 110 may include providing a number of graphical controls with which the user 20 can interact with and manipulate the dashboard UI 110 and the visual analytics 120 contained therein. When the user 20 selects one of the alternative visual analytics, the client computing device 210 can send the user input indicating the selection back to the business system 220. Using the user input indicating the selection of the alternative visual analytic, the analytics engine 320, or some other component of the business system 220, may generate the appropriate alternative visual analytic according to a corresponding business object 235, report definition 243, and/or visual analytic pattern 267. The resulting visual analytic 120 can then be sent back to the client computing device to be displayed as one of the visual analytics 120 presented to the user 20 in the dashboard UI 110.

Figure 3:
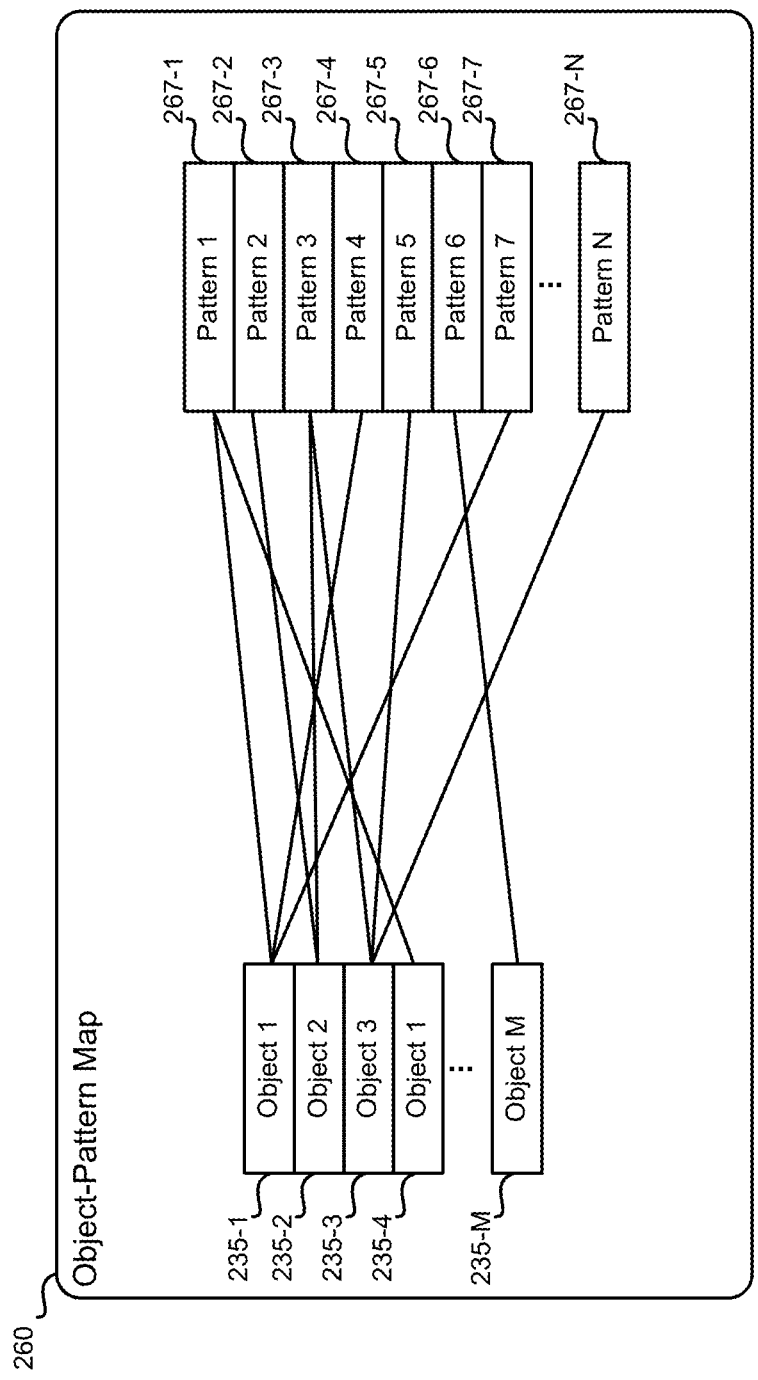
FIG. 3 is a business object-visual analytic pattern map according to one embodiments of the present disclosure.

FIG. 3 illustrates an example of an object-pattern map 260, according to various embodiments of the present disclosure. As shown the object-pattern map 260 may include a number of connections between specific business objects 235 and one or more alternative visual analytic patterns 267. In some embodiments, the object-pattern map 260 may be specific to a particular user. In such embodiments, the listing of the objects 235 may only include objects to which a particular user is authorized access. However, in other embodiments, the object-pattern map 260 may include object-pattern associations that are applicable to many users of the business system 220. Accordingly, in such embodiments, the object-pattern map 260 may include any and all of the objects 235 accessible by the business system 220. Authorization of a particular user to access a particular object would be left up to the authentication engine 320 of the business system 220.

In the example shown in FIG. 3, the business object 235-1 is associated with alternative patterns 267-1, 267-4, and 267-7. Similarly, business object 235-2 is associated with alternative visual analytic patterns 267-2 and 267-3. Business object 235-3 is associated with alternative visual analytic patterns 267-3, 267-5, and 267-N. Business object 235-4 is associated with a single alternative visual analytic pattern 267-1. Finally, 235-M is associated with a single alternative visual analytic pattern 267-6. While only an example number of business objects 235, visual analytic patterns 267, and associations are shown, one of ordinary skill in the art will recognize that the object-pattern map 260 may include any number M Business objects 235 and any number N alternative visual patterns 267, where M and N are natural numbers.

Figure 4A:
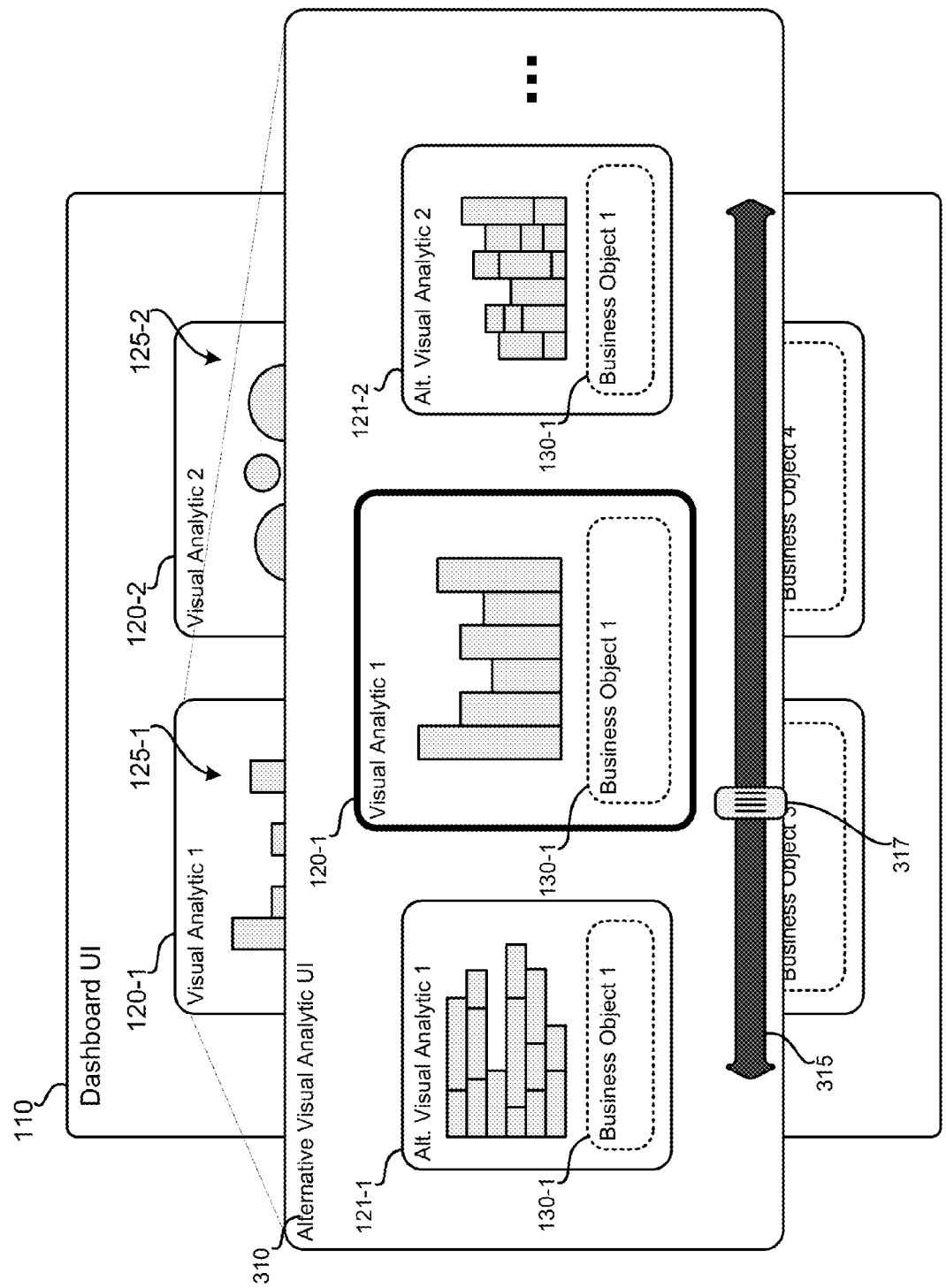
FIG. 4A illustrates a dashboard UI with controls for dynamically determining alternative visual analytics, according to various embodiments of the present disclosure.

FIG. 4A illustrates an example dashboard UI 110 that includes an alternative visual analytic UI 310, according to various embodiments of the present disclosure. As shown, the dashboard UI 110 may include a pop-up window that displays a number of alternative visual analytics 121. In the specific example shown, the alternative visual analytics 121 in the alternative visual analytic UI 310 may be shown as alternatives to the visual analytic shown as visual analytic 120-1. In some embodiments, the alternative visual analytics 121 include mock-ups of the alternative visual analytic pattern that will be used to generate alternative visual analytics 121 and do not include representations of actual data in or analytical data from business object 130. However, in other embodiments, the alternative visual analytics 121 presented in the alternative visual analytic UI 310 may include preliminary or fully generated visual representations of data in the underlying business objects 130 or analytical data from a report generated from the business object 130. In such embodiments, the alternative visual analytics 121 may be generated before or when the alternative visual analytic UI 310 is invoked.

In some embodiments, the alternative visual analytic UI 310 may be generated automatically in response to instructions received from the business system 220. For instance, if the analytics engine 320 or the pattern optimizer 250 detects the existence of an alternative visual analytic 121 based on analysis of the visual analytics 120 displayed in the dashboard UI 110, then the alternative visual analytic UI 310 may be rendered to show the user that there are potentially better alternatives.

In the specific examples shown in the alternative visual analytic UI 310, the alternative visual analytics 121 include stacked bar graphs as alternatives to the simple bar graph 120-1. The stacked bar graph can illustrate additional dimensions or aspects of the data not shown in the simple bar graph. In reference to the sales person example discussed herein, the stacked bar graphs in alternative visual analytics 121 show not only the total sales per sales person (i.e., the size of the stack), but also the contributions to those total sales numbers with respect to product type (i.e., the sizes of the stacked sections). Accordingly, the alternative visual analytics 121 show additional information available from aggregating the sales data by product type and sales person that was previously occluded in the total sales aggregation by sales person only.

In another embodiment, the alternative visual analytics 121 may include completely different types of visualization 125 than originally rendered in the visual analytic 120. For instance, the original visualization may include a pie chart. However, based on the analysis of the underlying analytical data, the visualization, the associated metadata, and/or recommendations of a technical or other user, it may be apparent to the pattern optimizer 250 that certain time dependent trends are not being shown in the pie chart. Accordingly, the pattern optimizer may identify and suggest an alternative visual analytic 121 that includes a visualization type that is better suited to showing trends, such as line graph.

Alternatively, the alternative visual analytic UI 310 may be invoked in response to user input received through controls in a visual analytic 120. For example, a user may select the visual analytic 120-1 or operate a menu item. In the context of a tablet computer or smart phone, selecting the visual analytic 120-1 may include touching the region of the screen in which a visual analytic 120-1 is rendered. In response to user input selecting the particular visual analytic 120-1, the dashboard UI 110 may generate the alternative visual analytic UI 310 as an overlay to the dashboard UI 110.

Once the alternative visual analytic UI 310 is displayed, a user may interact with (e.g., select or scroll through) one or more of the alternative visual analytics 121 using integrated controls in each one of the alternative visual analytics 121 or other controls, such as the slider bar or slider tab 315 and 317, to view or examine the proposed alternative visual analytics 121. The user may then select one or more of the alternative visual analytics 121. The client computing device 210 can then send the user input with the indication of the selected alternative visual analytic 121 back to the business system 220. In response, the analytics engine 320 can generate the appropriate reports, visual analytic, or combination thereof, and send the data back to the client computing device 210.

Legend Controls

Because of the inherently limited display space available on the display device of the client computing device 210, it is not always possible to display all the information necessary to fully understand the visual analytic in the framework of the fixed format and layout of visual analytics. The example visual analytic 120 is illustrated as being fixed in a predetermined square window into which all the analytical data, and visual representations thereof, must be displayed. In some scenarios, the chosen visual representation 125 of a given visual analytic may require additional labeling for the underlying data or analysis to be understood in detail. For example, some graphs require a legend that may include a key or code, to explain to the user what the graph is showing. However, adding a key or legend to the chart can quickly cause the visual analytic 120 in which the visualization is displayed to become cluttered, thus distracting from the intended clarity and simplicity of the information displayed. For example, in FIG. 4B, visual analytic 120-3 includes a bar graph with a number of visually coded bars (e.g., pattern, color, or shade coded filled bars) that represent values for some number of categories. For the purpose of illustration, each coded bar may represent a particular sales person, where the size of the corresponding bars may represent the monetary values of the total sales attributed to that sales person. However, as illustrated, there is no intuitive way for a user to determine which bar corresponds to which sales person. To learn such information, the user can select the legend control 410-3 to invoke a legend UI 420, shown in FIG. 4C.

The legend UI 420 may include a listing of some or all of the codes that associate each bar with a particular salesperson identifier (e.g., a name, ID number, etc.). In embodiments in which there are more codes, commonly referred to keys, than there is display space available in the legend UI 420, the legend UI may include controls 421 (e.g., scroll buttons) to navigate or scroll through all the available codes. In the example shown in FIG. 4C, there are six codes, however, there is only enough display space in the legend UI 420 to display three of the codes. In such circumstances, the user may scroll through the hidden codes by using the controls 421. As shown, the legend UI 420 may be rendered over the visual representation of the visual analytic 120-3. The rendered legend UI 420 may be rendered as opaque or transparent.

In one embodiment, the keys in the legend may also describe symbols used to label parts of the visualization of the analytical data. The symbols can include icons, images, pictures, such as exclamation points, arrows, signs, etc. that indicate various conditions in the data or analytical data depicted in the visualization. For example, the visualization may include arrow icons that indicate the current trends in the data. In particular, a visualization may include color coded arrows that indicate trending increases and trending decreases in the data by up and down arrows respectively. The legend may include a key as to what arrows mean. For instance, a red up-arrow may indicate a recent steep increase in the values of the data, while a blue up-arrow may indicate a gradual increase in the values of the data. Similarly, a blue down-arrow may indicate a recent gradual decrease, whereas a red down-arrow indicates a sharp decrease in the values over the same period in time.

Figure 4B:
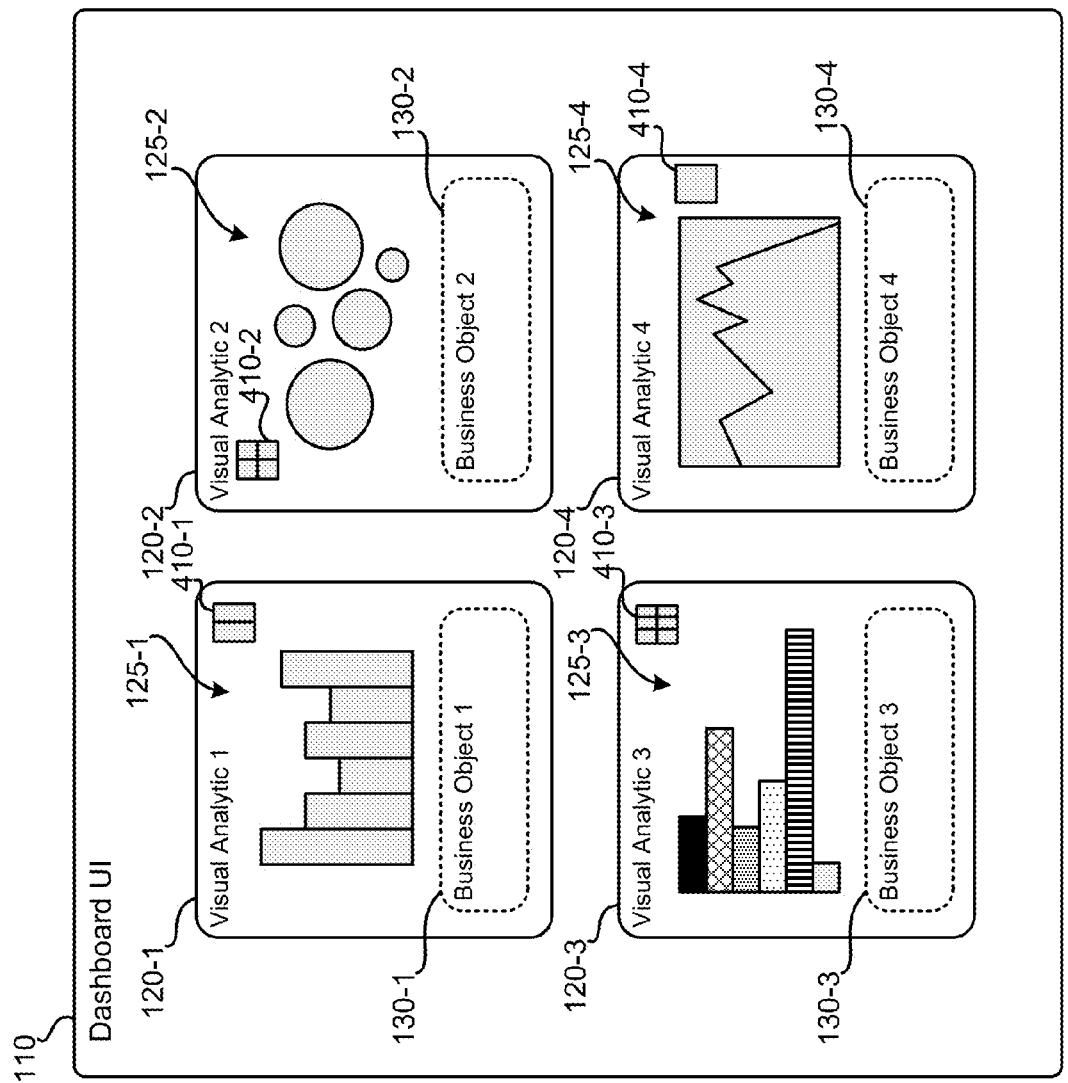
FIG. 4B illustrates an example dashboard UI with individual controls that can be used to display corresponding legends or keys, according to various embodiments of the present disclosure.
Figure 4C:
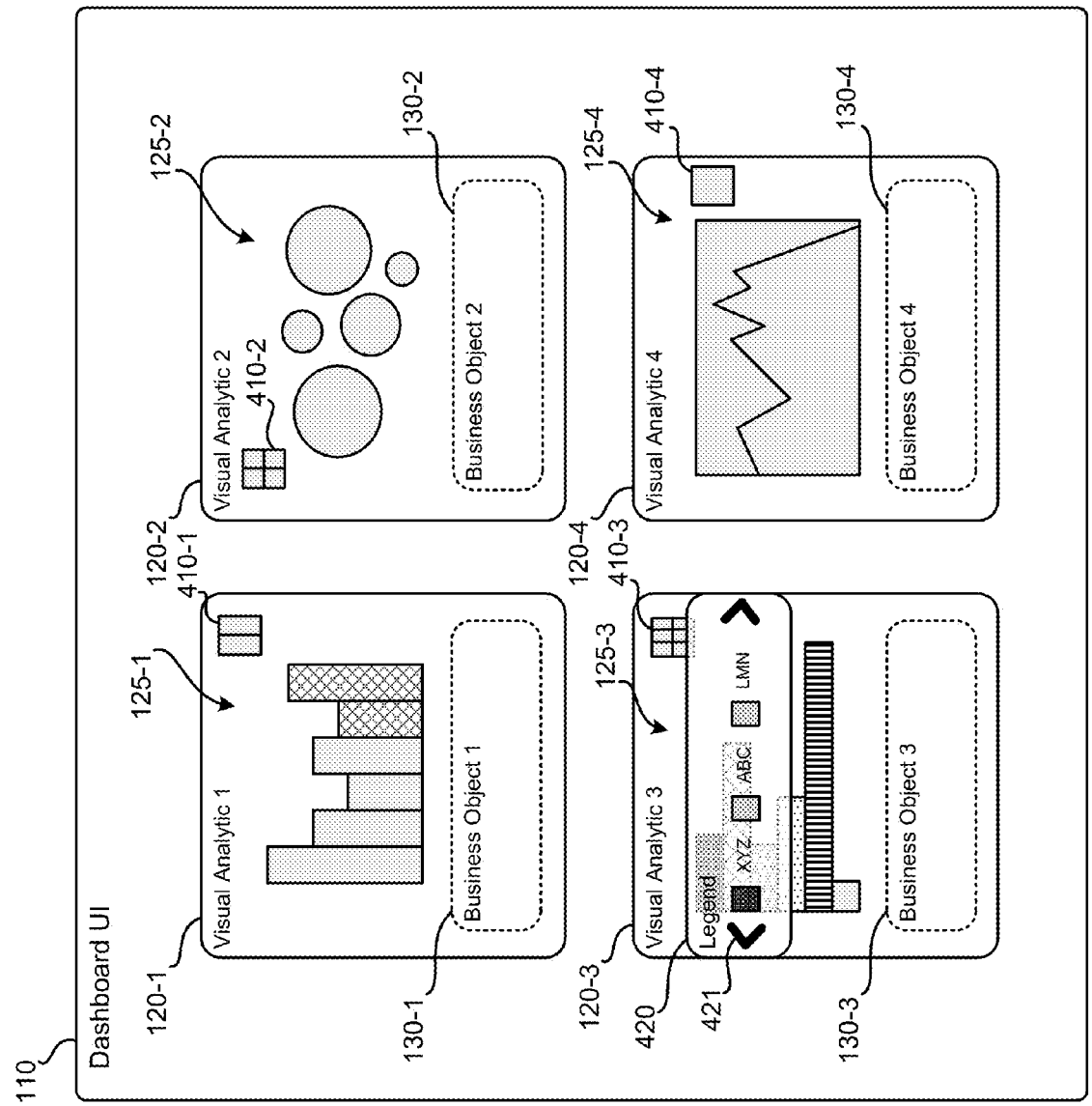
FIG. 4C illustrates an example dashboard UI with a superimposed legend or key for a particular visual analytic, according to various embodiments of the present disclosure.

In some embodiments, the legend controls 410 may include indications about the keys included in the legend UI 420. In some embodiments, the indication of the number keys in the associated legend UI 420 may be an alphanumeric code (e.g., a numeral representing the number of keys in the legend). In other embodiments, the indications can be symbolic. As illustrated in FIGS. 4B and 4C, the legend control 410 may include a number of divisions in the icon that symbolically represent the number of codes in the legend UI 410. For example, legend control 410-1 shows a control with two divisions, thus indicating that the legend UI 420 invoked by control 410-1 would include two codes (i.e., two pattern codes). Similarly, UI control 410-3 includes a grid of six divisions that represent the six codes that appear in the legend UI 420 that describe the six pattern-coded bars in the visual analytic 125-3.

Figure 5:
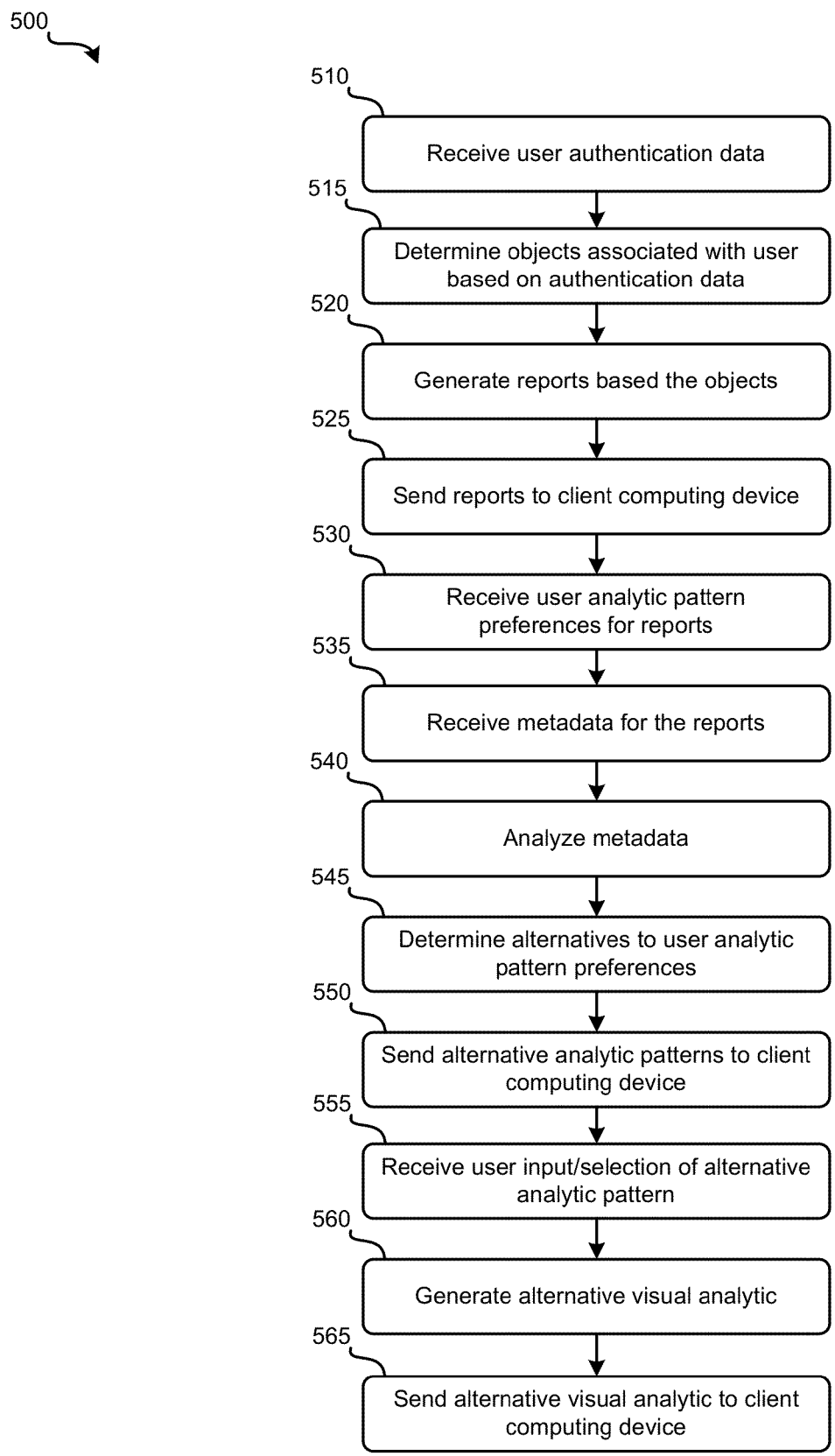
FIG. 5 is a flowchart of a method for dynamically selecting alternative visual analytics, according to various embodiments of the present disclosure.

FIG. 5 is a flowchart of a method 500 for determining alternative visual analytics 121, according to various embodiments of the present disclosure. The method 500 may begin at action 510, in which the business system 220 can receive user authentication data through a network from a remote client computing device 210. As discussed herein, the client computing device 210 may include a login UI 211 through which the client computing device 210 can collect user authentication data, such as a username and password, from the user 20. In response to the user authentication data, the business system 220 may determine business object 130 associated with the user 20, in action 515. In some embodiments, determining the objects 130 associated with the particular user 20, may also include determining a number of visual analytic patterns 267 and/or report definitions 243 that are associated with a particular user 20. The business object 130, visual analytic patterns 267, or report definitions 243 associated with the user 20 may be determined based on preferences defined by the user 20 or based on other information associated with the user 20 (e.g., job functions, roles, or responsibility).

In action 520, the business system 220 may generate a number of reports for the objects 130 using analytical operations defined in the associated report definitions 243. In action 525, the business system 220 can send the resulting reports to the client computing device 210. In some embodiments, the resulting reports may include alphanumeric data in a table or other data format. As such, the resulting reports may include various types of analytical data resulting from the execution of the analytical operations on one or more of associated business object 130.

In one embodiment, sending the resulting reports to the client computing device 210 may include sending the resulting reports along with an applicable or associated visual analytic patterns 267. The visual analytic patterns 267 may include generic or specific instructions, operations, or steps for generating visual representations 125 of the analytical data included in the report. The combination of the analytical data and the visual analytic patterns 267 may be used by the business system 220 or the client computing system 210 to render a number of visual analytics 120. The visual analytics 120 may include controls through which the client computing device 210 may receive user input indicating various visual analytic pattern preferences from the user 20. For example, the visual analytics may include controls for setting preferences of chart types to include in the visual analytic, as well as the size, color, and organization of the components of the chart.

Accordingly, in action 530, the business system 220 may receive user input indicating user visual analytic pattern preferences for the previously provided reports. The user visual analytic pattern preferences may include specifications specific to the user 20 for specific visual analytic patterns 267 to be applied to the reports and/or the analytical data contained therein. The business system 220 may use the user visual analytic pattern preferences in later determinations of alternative visual analytics. However, the business system 220 may override the user visual analytic pattern preferences when determining alternative visual analytic. In other embodiments, the user input also includes information indicating a request for alternative for a previously rendered visual analytic 120.

In action 535, the business system 220 may receive metadata 245 associated with one or more of the report definitions 243. The metadata 245 describes the dimensions and specific analysis generated by the analytical operations defined by the report definitions 243. In action 540, the business system 220 may analyze the metadata 245 to determine the dimensions of the analytical data of a report that results from the application of the associated report definition 243 to a business object 130. Using the dimensions of the analytical data represented in a visualization 125 of a particular visual analytic 120, the business system 220 may analyze the dimensions of visual analytic patterns 267 associated with specific business object 130 in an object-pattern map 260 to determine an alternative to the user pattern preferences and/or previously generated visual analytics 120, in action 545. For example, the business system 220 may search or visual analytic patterns 267 that the same or similar dimensions of the underlying analytic data. Alternatively, the business system 220 may select some or all of the visual analytic patterns 267 associated with the underlying business object 130 in the object-pattern map 260 and alternative visual analytic patterns. In such embodiments, the business system 220 may choose from a predetermined selection of suitable alternative visual analytic patterns. The predetermined selection of suitable visual analytic patterns may be determined by a technical user or other expert.

In action 550, the business system 220 may send the alternative visual analytic patterns to the client computing device 210. In action 555, the business system 220 may receive user input indicating the selection of one of the previously provided alternative visual analytic patterns. In response to receiving the user input, the business system 220 may generate a corresponding visual analytic 121 by applying the selected visual analytic pattern to the corresponding analytical data of a previously generated visual analytic based on the user pattern preferences, in action 560. In action 565, the business system 220 may then send the generated alternative visual analytic 121 to the client computing device 210 to be displayed in the dashboard UI 110. Sending the generated alternative visual analytic 121 to the client computing device 110 may include initiating a transmission over one or more wired or wireless electronic communication media or protocols.

Figure 6:
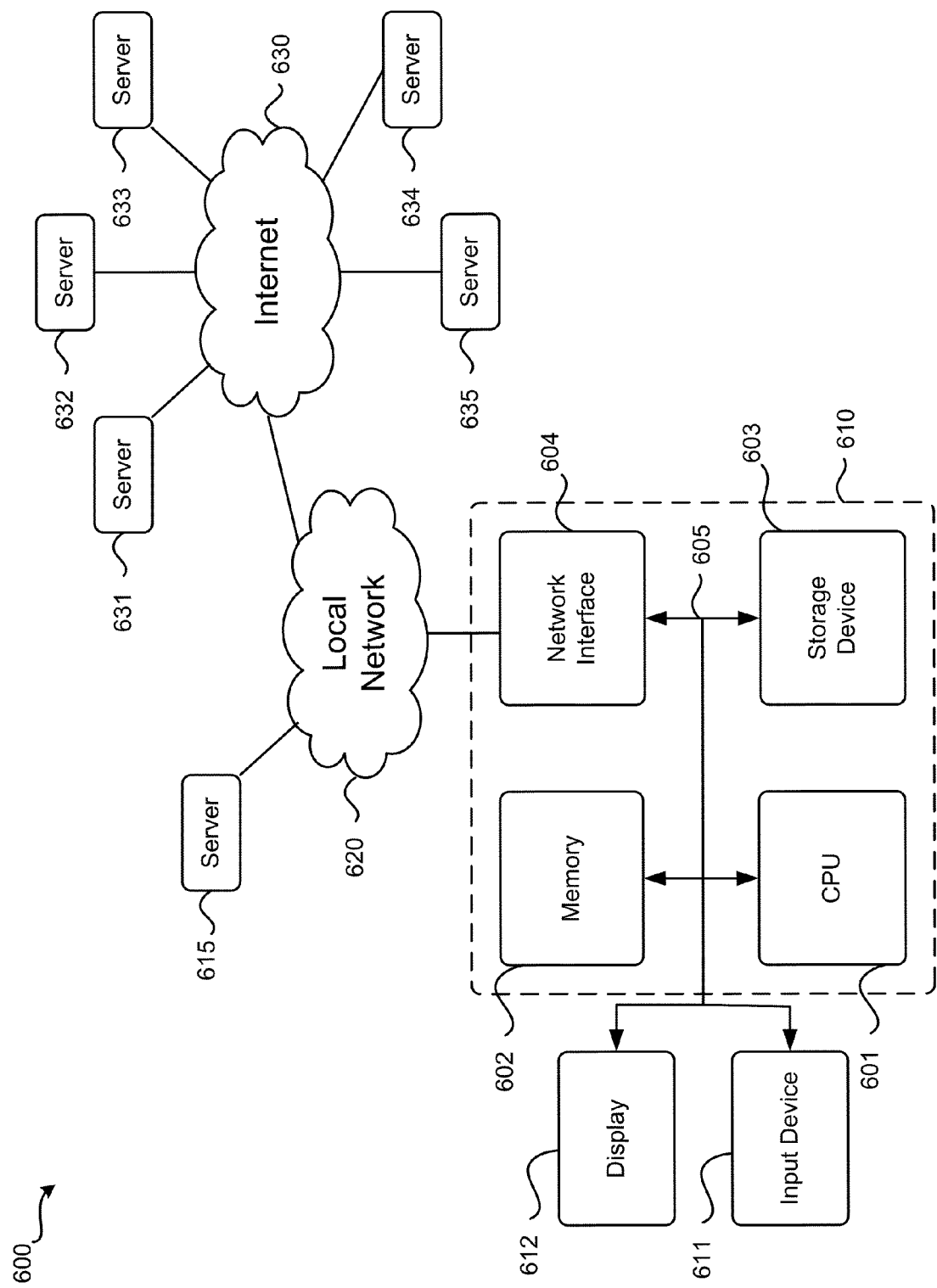
FIG. 6 is a schematic of a computer system in which various embodiments of the present disclosure may be implemented.

FIG. 6 illustrates an example computer system and networks that may be used to implement one embodiment of the present disclosure. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including instructions for performing the techniques described above. This memory may also be used for storing temporary variables or other intermediate information during execution of instructions to be executed by processor 601. Possible implementations of this memory may be, but are not limited to, random access memory (RAM), read only memory (ROM), or both. A storage device 603 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 610 may be coupled via the same or different information bus, such as bus 605, to a display 612, such as a cathode ray tube (CRT), touchscreen, or liquid crystal display (LCD), for displaying information. An input device 611 such as a keyboard and/or mouse is coupled to a bus for communicating information and command selections from the user to processor 601. The combination of these components allows the user to communicate with the system.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. A wireless network card is another example of the network interface to provide data communication to a compatible wireless LAN (WLAN). In any such implementation, network interface 604 sends and receives electrical, electromagnetic, or optical signals that carry digital data streams representing various types of information.

Computer system 610 can send and receive information, including messages or other interface actions, through the network interface 604 to an Intranet or the Internet 630. In the Internet example, software components or services may reside on multiple different computer systems 610 or servers 631 across the network. Software components described above may be implemented on one or more servers.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    retrieving, in a computer system, information associated with a visual analytic, the visual analytic comprising a first visualization of analytical data generated from a business object in accordance with a report definition and a corresponding first visual analytic pattern, wherein the report definition comprises analytical operations operable on the business object to generate the analytical data, and wherein the first visual analytic pattern comprises instructions for generating the first visualization of the analytical data;
    analyzing, in the computer system, the information associated with the visual analytic to generate a second visual analytic pattern comprising instructions for generating a second visualization of the analytical data different from the first visualization;
    in response to receiving a selection of one of the first and second visual analytic patterns from a client computing device, sending the selected one of the first and second visual analytic patterns to the client computing device for the client computing device to display one of the first and second visualizations corresponding to the selection; and
    analyzing the first visualization or the second visualization to determine a first region in the first visualization or a second region in the second visualization with space in which to render a legend control.

2. The method of claim 1, wherein the information associated with the visual analytic comprises metadata associated with the report definition, the metadata comprising descriptions of the analytical operations.

3. The method of claim 1, wherein the information associated with the visual analytic comprises metadata associated with the first visual analytic pattern, the metadata comprising descriptions of the first visualization.

4. The method of claim 1, wherein the information associated with the visual analytic comprises a mapping comprising an association between the second visual analytic pattern and at least one of the report definition, the first visual analytic pattern, or the business object, and wherein analyzing the information comprises referencing the mapping.

5. The method of claim 1, wherein sending the selected one of the first and second visual analytic patterns to the client computing device comprises:
    generating one of the first and second visualizations of the analytical data in accordance with the selected one of the first and second visual analytic patterns; and
    sending the generated visualization to the client computing device.

6. The method of claim 1 further comprising modifying, in the computer system, the report definition by augmenting the analytical operations operable on the business object to generate additional analytical data required by the second visual analytic pattern for generating the second visualization of the analytical data, wherein the analytical data comprises the additional analytical data.

7. A non-transitory computer readable medium comprising instructions, that when executed by a computer processor cause the computer processor to be configured for:
    retrieving information associated with a visual analytic, the visual analytic comprising a first visualization of analytical data generated from a business object in accordance with a report definition and a corresponding first visual analytic pattern, wherein the report definition comprises analytical operations operable on the business object to generate the analytical data, and wherein the first visual analytic pattern comprises instructions for generating the first visualization of the analytical data;
    analyzing the information associated with the visual analytic to generate a second visual analytic pattern comprising instructions for generating a second visualization of the analytical data different from the first visualization;
    in response to receiving a selection of one of the first and second visual analytic patterns from a client computing device, sending the selected one of the first and second visual analytic patterns to the client computing device for the client computing device to display one of the first and second visualizations corresponding to the selection; and
    analyzing the first visualization or the second visualization to determine a first region in the first visualization or a second region in the second visualization with space in which to render a legend control.

8. The non-transitory computer readable medium of claim 7, wherein the information associated with the visual analytic comprises metadata associated with the report definition, the metadata comprising descriptions of the analytical operations.

9. The non-transitory computer readable medium of claim 7, wherein the information associated with the visual analytic comprises metadata associated with the first visual analytic pattern, the metadata comprising descriptions of the first visualization.

10. The non-transitory computer readable medium of claim 7, wherein the information associated with the visual analytic comprises a mapping comprising an association between the second visual analytic pattern and at least one of the report definition, the first visual analytic pattern, and the business object, and wherein analyzing the information comprises referencing the mapping.

11. The non-transitory computer readable medium of claim 7, wherein the instructions that cause the computer processor to be configured for sending the selected one of the first and second visual analytic patterns to the client computing device further comprise instructions that cause the computer processor to be configured for:
- Generating one of the first and second visualizations of the analytical data in accordance with the selected one of the first and second visual analytic patterns; and
- sending the generated visualization to the client computing device.

12. The non-transitory computer readable medium of claim 7, wherein the instructions further cause the computer processor to be configured for modifying the report definition by augmenting the analytical operations operable on the business object to generate additional analytical data required by the second visual analytic pattern for generating the second visualization of the analytical data, wherein the analytical data comprises the additional analytical data.

13. A system comprising:
- a computer processor; and
- a non-transitory computer readable medium coupled to the processor and comprising instructions, that when executed by the computer processor cause the computer processor to be configured to:
- retrieve information associated with a visual analytic, the visual analytic comprising a first visualization of analytical data generated from a business object and in accordance with a report definition and a corresponding first visual analytic pattern, wherein the report definition comprises analytical operations operable on the business object to generate the analytical data, and wherein the first visual analytic pattern comprises instructions for generating the first visualization of the analytical data;
- analyze the information associated with the visual analytic to generate a second visual analytic pattern comprising instructions for generating a second visualization of the analytical data different from the first visualization;
- in response to receiving a selection of one of the first and second visual analytic patterns from a client computing device, send the selected one of the first and second visual analytic patterns to the client computing device for the client computing device to display one of the first and second visualizations corresponding to the selection; and
- analyze the first visualization or the second visualization to determine a first region in the first visualization or a second region in the second visualization with space in which to render a legend control.

14. The system of claim 13, wherein the information associated with the visual analytic comprises metadata associated with the report definition, the metadata comprising descriptions of the analytical operations.

15. The system of claim 13, wherein the information associated with the visual analytic comprises metadata associated with the first visual analytic pattern, the metadata comprising descriptions of the first visualization.

16. The system of claim 13, wherein the information associated with the visual analytic comprises a mapping comprising an association between the second visual analytic pattern and at least one of the report definition, the first visual analytic pattern, or the business object, and wherein the instructions that cause the computer processor to be configured to analyze the information further comprise instructions that cause the computer processor to be configured to reference the mapping.

17. The system of claim 13, wherein the instructions that cause the computer processor to be configured to send the selected one of the first and second visual analytic patterns to the client computing device further comprise instructions that cause the computer processor to be configured to:
- generate one of the first and second visualizations of the analytical data in accordance with the selected one of the first and second visual analytic patterns; and
- send the generated visualization to the client computing device.

18. The system of claim 13, wherein the instructions further cause the computer processor to be configured to modify the report definition by augmenting the analytical operations operable on the business object to generate additional analytical data required by the second visual analytic pattern for generating the second visualization of the analytical data, wherein the analytical data comprises the additional analytical data.

* * * * *